United States Patent Office 3,421,574
Patented Jan. 14, 1969

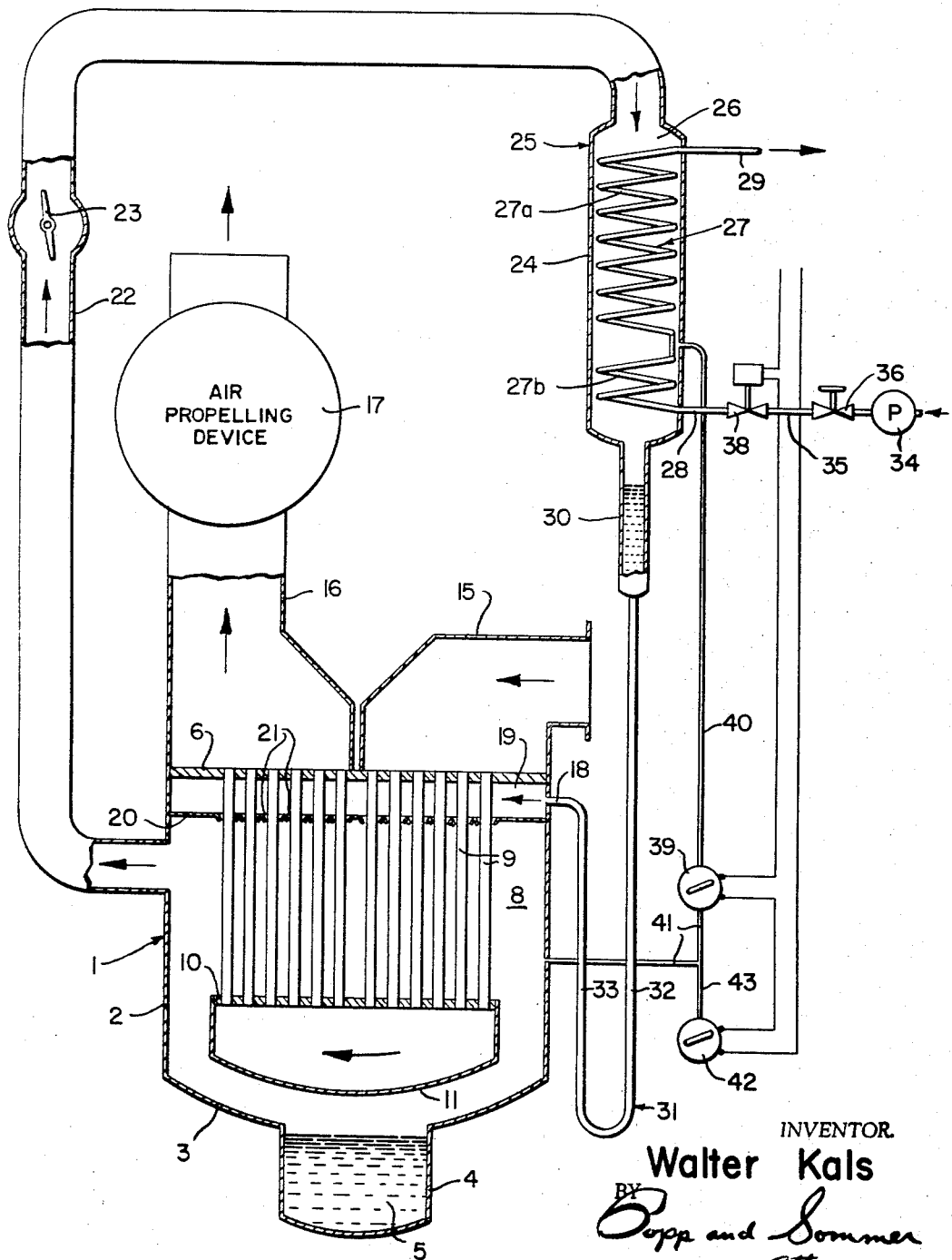

3,421,574
METHOD AND APPARATUS FOR VAPORIZING AND SUPERHEATING COLD LIQUEFIED GAS
Walter Kals, Hastings on Hudson, N.Y., assignor to Niagara Blower Company, New York, N.Y., a corporation of New York
Continuation of application Ser. No. 357,513, Apr. 6, 1964. This application Mar. 11, 1966, Ser. No. 533,730
U.S. Cl. 165—2        14 Claims
Int. Cl. F25b *13/00;* F28d *15/00;* F17c *7/02*

ABSTRACT OF THE DISCLOSURE

Cryogenic liquids, such as liquid nitrogen at −320° F., are vaporized by using them to condense a refrigerant, such as Refrigerant-21, which serves as a heat transfer medium, and then the refrigerant is vaporized, in a closed cycle, by ambient air as the heat source. The rate of supply of the cryogenic liquid is adjusted in response to the differential in the vaporizing and condensing pressures of the refrigerant, and the flow of liquefied gas is interrupted by signal from a pressure actuated switch if the temperature of the refrigerant, as the heat transfer medium, drops close to the freezing point of any component in the heat source.

---

This application is a continuation of my copending application bearing the same title and Ser. No. 357,513, filed Apr. 6, 1964 (now abandoned).

This invention relates to a method and apparatus for vaporizing and superheating cold liquefied gases, such as liquid nitrogen, having a temperature of −320° F., oxygen (−297° F.), methane (−297° F.), ethylene (−155° F.), ethane (−128° F.), propane (−44° F.), and ammonia (−28° F.), as well as gas mixtures, such as natural gas.

At normal temperatures these are gases, but are presently stored as liquids at the above low temperatures. By such storage as cryogenic or cold liquids, the storage vessels will hold gas quantities of more than 800 times their weight at ambient temperature and atmospheric pressure. Due to their low temperature the liquefied gases so stored will remain in liquid form at nearly atmospheric pressure and the walls of the storage vessels need not be constructed for high pressure service.

Evaporation of these cold gases becomes necessary if they are to be used as gases at ambient temperatures and at near atmospheric pressures. Representative examples would be the use of oxygen for furnaces and for rocket research, the use of methane or propane as a gaseous fuel, etc.

On the other hand, some liquefied gases, like nitrogen, are transported and stored at nearly atmospheric pressure solely for the purpose of producing a cooling effect of comparatively short duration, low temperature being produced without any refrigerating equipment.

Where consumption of the liquefied gas at ambient temperature is the primary objective, various types of steam heated, electrically heated, or direct fired evaporators have been used. All of these have various disadvantages and shortcomings. None permit the utilization of the refrigerating effect of such cryogenic or cold liquids although this could prove to be highly desirable.

If the refrigerating effect is the only objective of vaporizing the liquefied gas, it is important to utilize the gas economically. In some instances, the excessively low temperatures resulting from the use of the gas generated directly from the cryogenic liquid could be harmful and it would be of great benefit to be able to hold the refrigerant temperature developed from liquefied gases within desirable limits.

It is the general purpose of this invention to provide a practical and economical method and apparatus for withdrawing heat at ordinary temperatures, frequently near the freezing point of water, and to surrender this heat to a liquefied gas at a cryogenic or subzero temperature. This transmission of heat from a source at relatively high temperature to a sink at very low temperature may have the objective of cooling or condensing a fluid forming the "heat source," or of vaporizing a liquefied gas forming the "heat sink," or both.

A direct exchange of heat between such a high temperature source and low temperature sink would be difficult because of the extreme temperature differential. A portion of the direct heat exchange surface could assume cryogenic temperatures which the fluid to be cooled or condensed may not be able to tolerate. With such direct heat exchange surface it would also be impossible to obtain the full refrigerating capacity of the liquefied gas by dismissing the gas developed therefrom at the highest possible temperature in addition to utilizing the refrigerating effect developed by merely converting it into a gas. The heat transfer characteristics of the two fluids participating in such a direct exchange of heat and their most desirable flow patterns, may be vastly different, and it would then be impossible to provide a heat exchange surface of any practical shape or form to satisfy the requirements of both substances.

In accordance with the present invention a suitable fluid heat exchange medium is employed as a carrier of heat from source to sink. More specifically, this fluid heat exchange medium receives heat at the source by evaporation of the fluid heat exchange medium, and surrenders this heat to the sink by condensing. There are considerable advantages in conveying heat in this manner, namely, by changing the fluid heat exchange medium from a state of liquid to a state of vapor and then back to a state of liquid. By changing from liquid to vapor the fluid heat exchange medium must occupy a vastly greater space. The vapor will therefore move away from the heat source as it expands, and can thus be readily channelled to the heat sink. There, the necessary space becomes available as the vapor changes back to liquid form. The condensed liquid can then be returned to the heat source by gravity flow if this condensation is taking place at a higher elevation. Consequently no mechanical device is needed to circulate the fluid heat exchange medium. Another advantage can be seen in the fact that the transfer of heat to the fluid heat exchange medium as it evaporates, and from the fluid heat exchange medium as it condenses, can be entertained at a relatively high rate. Also, a desirable temperature gradient between the heat source and heat sink can be maintained by controlling the pressure differential in the spaces in which evaporation and condensation of the fluid heat exchange medium are taking place.

A desired minimum resultant temperature of the fluid heat exchange medium by its vaporization at the source of heat can easily be controlled by limiting its minimum evaporating pressure. Such can readily be obtained by cutting off the supply of the cryogenic or cold liquid in response to such minimum pressure.

It is also possible to obtain economical utilization of the full refrigeration potential of the cryogenic or cold liquid by controlling the supply of the cryogenic or cold liquid in response to the differential between the evaporating and condensing pressures of the heat exchange medium.

Accordingly important objects of the present invention are:

(1) To provide a practical and economical apparatus for vaporizing cryogenic or subzero liquids without employing steam, electrical, direct fired or other source of manufactured heat.

(2) To provide a practical and economical method and apparatus for transferring heat at ordinary temperatures, frequently near the freezing point of water, to a liquefied cryogenic or subzero gas, without:

(a) developing a heat exchange surface condition which the fluid to be cooled or condensed may not be able to tolerate, (b) with full utilization of the potential refrigerating capacity by not only converting the cryogenic liquid to a gas but also dismissing this gas at the highest possible temperature, (c) with the utilization of separate heat transfer surfaces best suited to the individual flow patterns and heat transfer characteristics of the liquefied gas and the fluid to be cooled or condensed.

(3) To provide such a method and apparatus which can be used either to (a) cool or condense a fluid forming a heat source, (b) vaporize the liquefied gas forming the heat sink, (c) or both.

(4) To provide such a method and apparatus which when used to provide the economical use of the liquefied gas for its refrigerating effect (a) avoids the excessively low temperatures generated directly from the liquefied gas where such excessively low temperature may be harmful to the material being served, (b) holds the refrigerant temperature developed from the liquefied gas within desirable limits.

(5) To provide such method and apparatus utilizing a fluid heat exchange medium to conduct the heat from the heat source to the sink in which (a) the fluid heat exchange medium can be self-propelling by vaporizing to move from the heat source to the sink and condensing at the sink to return to the heat source by gravity, (b) the transfer of heat to and from the fluid medium can be at a high rate due to its vaporization at the heat source and its condensation at the sink, (c) a desirable temperature gradient can be maintained between the heat source and heat sink by employing a fluid medium which vaporizes at the former and condenses at the latter and by controlling the pressure differential between the spaces in which evaporation and condensation of the fluid medium are taking place, (d) a desirable minimum resultant temperature of the fluid heat exchange medium can easily be obtained by utilizing a fluid heat exchange medium which vaporizes at the source and by limiting its minimum evaporating pressure.

(6) To provide such method and apparatus in which a substantial body of the fluid heat exchange medium can be built up in liquid form to be available to cool the fluid forming the heat source unabated or at a constant rate notwithstanding fluctuations in the supply of, or even complete shut off of, the cold or cryogenic liquid forming the heat sink, thereby to eliminate both fluctuatings and also short cycling of the method and apparatus.

Other objects and advantages of the invention will be apparent from the following drawings in which:

The figure is a diagrammatic representation of apparatus for vaporizing and superheating cold liquefied gases in accordance with the present invention.

The numeral 1 represents an evaporator shown as having a vertically disposed cylindrical shell 2 provided with a bottom end head 3 the center of which is depressed to form a sump 4 for collecting the fluid heat exchange medium as a body 5 in liquid form. An upper tube sheet 6 extends across the full extent of the shell 2 to provide an evaporating chamber 8 containing a bundle of vertical straight tubes 9 which connect with and are suspended from the upper tube sheet 6. The lower ends of the bundle of tubes 9 connect with a lower tube sheet 10 which is of smaller size than the cross sectional size of the evaporating chamber 8 and to the rim of which a bottom header 11 is secured to provide a return header for the bundle of tubes 9. The fluid, such as air to be cooled, is conducted in two consecutive passes through the bundle of tubes 9, entering through an inlet 15 secured to the upper tube sheet 6 so as to deliver the fluid to be cooled to the open upper ends of one half of the bundle of tubes 9 which form downtake tubes. After having been cooled by passage through the bundle of tubes 9, this fluid leaves through an outlet 16 which is secured to the tube sheet 6 so as to contain the open upper ends of the other half of the bundle of tubes 9 which form the uptake tubes. A suitable propelling device 17 is provided for so moving the fluid forming the heat source through the bundle of tubes 9, such being in the form of a pump or blower, or being the inlet to a compressor where it is desired to cool the gas or air supplied to the compressor to improve its volumetric efficiency.

Cooling is provided by a fluid heat exchange medium which is introduced in liquid form through an inlet 18 into a chamber 19 formed in the upper part of the shell 2 by a horizontal distributing plate 20. This distributing plate is secured and healed at its margin to the wall of the shell 2 and is provided with annular openings 21 through which the tubes 9 severally extend, the diameter of each of these openings being slightly larger than the tube 9 extending therethrough so that the fluid heat exchange medium in liquid form introduced into the chamber 19 flows over the entire surface of the distributing plate 20 and escapes through the openings 21 to flow by gravity along the external surface of the tubes 9. On its downward flow along the tubes, this heat exchange medium in liquid form vaporizes, thus producing the cooling effect applied to the fluid to be cooled passing through the bundle of tubes 9 from the inlet 15 to the outlet 16.

The expansion of vapor so produced on the tubes 9 in the evaporating chamber 8 forces the vapor through an outlet conduit 22 containing a valve 23 into the upper end of the shell 24 of a condenser 25 forming a condensing chamber 26 which contains a tube or pipe coil 27. Desirably this condensing tube coil 27 comprises a large area upper part 27a from which a small area lower part 27b is suspended for a purpose which will presently appear. A cold liquefied gas enters the lower part 27b of the pipe or tube coil 27 through an inlet 28. The vapor of the fluid exchange medium generated in the evaporator 1 fills the shell 24 of the condenser 25 and condenses on the external surface of the pipe or tube coil 27. The heat surrendered by this condensing heat exchange medium causes the cyrogenic liquid or cold liquefied gas entering the bottom part 27b of the coil 27 from the inlet 28 to convert to a gas and to be sufficiently warmed or superheated before leaving the upper part 27a of the pipe or tube coil 27 through an outlet 29. The condensed heat exchange medium running off the external surface of the pipe or tube coil 27 flows by gravity to a liquid outlet line 30 extending downwardly from the bottom of the vessel 24 and is preferably being of the larger diameter shown. The bottom of the liquid line 30 is connected to the inlet 18 of the evaporator 1 by a U-shaped liquid leg 31 in which the heat exchange medium in liquid form builds up. The enlarged diameter liquid outlet line 30 is included in one side 32 of this U-shaped liquid leg 31 and this side is of greater height than the other side 33 of this U-shaped liquid leg to provide a gravity flow of the condensate from the condenser 25 to the evaporator 1.

Before any fluid commences to flow through the interior of the bundle of tubes 9 and before the cryogenic liquid or cold liquefied gas is admitted to the pipe or tube coil 27, the fluid heat transfer medium will collect in liquid form in the sump 4 and in the U-shaped leg 31 connecting the liquid outline line 30 of the condenser 25 with the inlet 18 of the evaporator 1. All communicating spaces above these liquid bodies will be occupied by the vapor phase of the fluid heat transfer medium, provided air or other non-condensible gases are not present.

The control system for the apparatus is illustrated as follows:

The cryogenic liquid or cold liquefied gas is supplied to the inlet 28 of the coil 27 by a pump 34 through a line 35 containing a hand valve 36 and a normally closed solenoid valve 38. This normally closed solenoid valve 38 is electrically in series with a switch 39 which is actuated by the difference in pressure between a vapor pressure line 40 connecting with the interior 26 of the shell 24 of the condenser 25 and a vapor pressure line 41 connecting with the evaporating chamber 8 of the heat exchanger 1. This solenoid valve 38 and this differential pressure actuated switch 39 are also electrically in series with a low limit pressure switch 42, which, through a branch line 43 of the line 41, is actuated in response to the pressure in the evaporating chamber 8 of the heat exchanger 1.

OPERATION

It will be assumed that the cryogenic liquid or cold liquefied gas used in the process is liquid nitrogen admitted at a temperature of −320° F. through the line 35 to the inlet 28 by opening the hand valve 36. It will also be assumed that Refrigerant-21 (dichloromonofluoromethane) has been chosen as the fluid heat exchange medium, which will be at a pressure of about 33.6 p.s.i.a. if an ambient temperature of 90° F. prevails. It will also be assumed that air at this ambient temperature is the fluid to be cooled and is moved by the propelling device 17 in the form of a blower from the inlet 15 downwardly through the downflow tubes 9 into the return header 11 and thence through the upflow tubes 9 and the outlet 16.

By opening the hand valve 36 liquid nitrogen at a temperature of −320° F. is admitted to the pipe or tube coil 27 contained in the shell 24 of the condenser 25 and the Refrigerant-21 vapor contained within this shell 24 will start condensing on the outside surface of the pipe coil 27. Simultaneously, the liquid nitrogen entering the pipe or tube coil 27 will vaporize and leave the outlet 29 from the pipe or tube coil 27 in a gaseous superheated state.

This condensation of the Refrigerant-21 vapor in the shell 24 of the condenser 25 will cause a decrease of pressure in this shell. Refrigerant-21 vapor from the evaporating chamber 8 above the liquid sump 4, which is still at 33.6 p.s.i.a. pressure, will then flow through the conduit 22 past the valve 23 into the shell 24 of the condenser 25, and the vapor pressure above the body 5 of Refrigerant-21 liquid contained in the sump 4 will thus be lowered. The body 5 of Refrigerant-21 liquid will therefore start boiling in the sump 4 and the generated vapor will be drawn through the conduit 22 into the shell 24 of the condenser 25 to condense on the pipe or tube coil 27. Since the sump 4 cannot gain any appreciable amount of heat from its environment, the evaporating pressure will continue to drop so that the progressive temperature reduction of the boiling liquid 5 in the sump 4 supplies the heat of evaporation.

When the lowest desirable evaporator pressure in the evaporating chamber 8 is reached, the low limit pressure switch 42 will open its electrical contacts thereby to deenergize the normally closed solenoid valve 38 which is electrically in series therewith. This closes this normally closed solenoid valve 38 so as to stop the flow of liquid nitrogen to the condensing coil 27. With rising evaporating pressure in the evaporating chamber 8 the low limit pressure switch 42 will close its contacts to energize the normally closed solenoid valve 38 so that liquid nitrogen from the supply line 35 will again be supplied to the condensing coil 27, and the body 5 of liquid Refrigerant-21 in the sump 4 will again start to boil and Refrigerant-21 vapor will again flow through the conduit 22 to condense on the exterior of the condensing coil 27 in the shell 24 of the condenser 25.

The Refrigerant-21 condensing on the condensing coil 27 flows down through the enlarged liquid line 30 which forms the upper end of the side 32 of the U-shaped liquid leg or trap 31 by gravity and thence flows through the shorter side 33 of this U-shaped liquid leg into the inlet 18 for the upper chamber 19 of the evaporator 1. This liquid flows onto the distributing plate 20 and escapes through the holes 21 therein onto the outside surface of the bundle of tubes 9 which extend through these holes 21 and down which it descends by gravity as falling films.

With a fluid, such as air, at the assumed temperature of 90° F. passing from the inlet 15 through the downtake tubes 9, return header 11, uptake tubes 9 and outlet 16, the evaporating temperature of the Refrigerant-21 will adjust itself so that a temperature gradient for the steady flow of heat from the evaporating Refrigerant-21 flowing down by gravity along the outside surfaces of the tubes 9 to the fluid passing through the interior of these tubes is established. The temperature gradient will depend upon the flow rate, specific heat and heat transfer coefficient of the fluid to be cooled passing through the interior of these tubes and also upon the size of the heat transfer surface provided by these tubes.

For example, assume that a Refrigerant-21 evaporating temperature of +26° F. has been chosen for cooling a particular fluid passing through the interior of the tubes 9 at a given rate over a given temperature range, and that the bundle of tubes 9 has been sized to accommodate the exchange of heat under these conditions of design. The corresponding evaporating pressure of the Refrigerant-21 will then be 8.9 p.s.i.a.

The Refrigerant-21 vapor must then be condensed on the outside surface of the condensing coil 27 at the same rate at which it is generated. For the assumed conditions of design, this condensing coil 27 may, for example, have been sized to cool the Refrigerant-21 vapor from +26° F. to −50° F. and then condense it at −50° F. or 1 p.s.i.a. pressure. Liquid nitrogen flowing countercurrent through the condensing coil 27 will first evaporate at −320° F. and the nitrogen gas will then, accordingly to the assumed design, be allowed to warm up or become superheated to a temperature of +10° F. before being released.

Under these conditions the pressure difference between the Refrigerant-21 evaporating at 8.9 p.s.i.a. and condensing at 1.0 p.s.i.a. will be 7.9 p.s.i.a. The head of liquid Refrigerant-21 in the side 32 of the U-shaped leg 31 (including the enlarged liquid line 30) must then be about 11 feet to balance that pressure difference and to permit gravity return of the liquid Refrigerant-21 from its condenser 25 to its evaporator 1. The condenser 25 would therefore be placed about 12 feet higher than the bundle of tubes 9.

At a higher evaporating pressure the Refrigerant-21 condensate would back up into the shell 24 of the condenser 25 and would then submerge a part of the bottom portion 27b of the condensing coil 27. By such reduction of the effective heat exchange surface of this condensing coil 27 the nitrogen gas would be released from 29 colder than planned. By discontinuing temporarily the flow of liquid nitrogen into this evaporator coil 27 the condensing pressure will rise and the condensate held up in the bottom of the shell 24 of the condenser 25 and submerging part or all of the bottom part 27b of the coil 27 will drain into the evaporator 1, thereby continuing without interruption the refrigerating effect upon the fluid to be cooled passing through the interior of the bundle of tubes 9. By this build up of liquid Refrigerant-21 both in the enlarged outlet 30 and also in the bottom of the tank 24, it will be seen that the operation of cooling the fluid forming the heat source flowing through the interior of the tubes 9 is smoothed out and short cycling eliminated. Thus this build up of Refrigerant-21 will continue its refrigerating or evaporative cooling effect on the exterior of the tubes 9 until this build up is exhausted even though the normally closed solenoid valve 38 has been deenergized. Subsequently, the flow of liquid nitrogen is again resumed, and formation of Refrigerant-21 condensate on the exterior of the coil 27 is resumed.

Such desired control of the flow of liquid nitrogen to the coil 27 is achieved automatically by opening and closing the solenoid valve 38 in response to the pressure differential between the chambers 8 and 26 in which evaporation and condensation of the Refrigerant-21 take place. Too high an evaporating pressure in the chamber or space 8 or too low a condensing pressure in the chamber or space 26 will result in too great a pressure difference. The switch 39, which is actuated by this difference in pressure in these spaces, will then open its electrical contacts. Since these contacts are in series with the normally closed solenoid valve 38, this will cause the solenoid valve to close when too great a pressure differential obtains in these chambers 8 and 26.

If the evaporating pressure in chamber 8 is high and the Refrigerant-21 vapor reaches the condenser at higher temperature, it is not necessary to supply the liquid nitrogen continuously. A sufficient amount of Refrigerant-21 is accumulated in the enlarged upper part 30 of the side 32 of the U-shaped leg 31 while liquid nitrogen is supplied. This accumulation occurs as the difference increases between the evaporating pressure in the evaporating chamber 8 and the condensing pressure in the condensing space 26, and as a result a head of liquid is built up in 30 to balance this pressure difference. The pressure difference will decrease as soon as the supply of liquid nitrogen is stopped, because the condensing pressure in the condensing space 26 will then start rising. Consequently, the head of liquid in 30 balancing the pressure difference will diminish, the supply of accumulated Refrigerant-21 condensate in 30 draining into the evaporator 1 and thus continuing to provide the refrigerating effect to the fluid passing through the interior of the bundle of tubes 9 to avoid a short cycling. When a sufficiently small pressure differential obtains between the evaporating chamber 8 and condensing space 26 the switch 39, which is actuated by the difference in these pressures, will close its electrical contacts to energize the normally closed solenoid valve, thereby to cause the flow of liquid nitrogen to the condensing coil 27 to resume. Accordingly the condensing pressure in the condensing space 26 will fall and Refrigerant-21 condensate will again start accumulating in the enlarged upper part 30 of the side 32 of the U-shaped liquid leg 31. As a general rule the difference between the evaporating pressure in the evaporating chamber 8 and the condensing pressure in the condensing space 26 should be held at a practical minimum.

Intermittent supplies of liquefied gas at subzero or cryogenic temperature, regulated in the described manner by a differential pressure switch 39, will provide for its economical use as a cooling medium whenever employment of this kind of cooling medium is advantageous, and the use of a fluid heat exchange medium alternating between vapor and liquid phases in its service as a fluid heat exchange medium between the cold or cryogenic liquid and a fluid to be cooled will achieve the objects and advantages previously set forth.

I claim:

1. The method of vaporizing and superheating, in a thermodynamic system, a non-recycled moving stream of cold liquefied gas, derived from a source outside of the thermodynamic system and discharged as a gas to a space which is out of communication with said source, to cool a fluid forming a heat source, which comprises moving a stream of said liquefied gas, moving a stream of said fluid forming a heat source, vaporizing a body of liquid heat exchange medium through heat exchange with said moving stream of fluid forming a heat source, condensing the vapors generated by such vaporization through heat exchange with said moving stream of cold liquefied gas at essentially the same pressure and temperature at which it was so vaporized, to thereby also vaporize and superheat said moving stream of liquefied gas, returning the condensate formed by such condensation to said body of liquid, said liquid heat exchange medium, and the vapors so generated therefrom, being isolated from intermixture with both said fluid forming said heat source and also from intermixture with cold liquefied gas in both liquid and vapor phases, and cutting off the supply of said cold liquefied gas in response to a minimum vaporizing pressure of said heat exchange medium.

2. The method of vaporizing and superheating a cold liquified gas to cool a fluid forming a heat source, which comprises vaporizing a body of liquid heat exchange medium through heat exchange with said fluid forming a heat source, condensing the vapors generated by such vaporization through heat exchange with said cold liquefied gas to thereby also vaporize said liquefied gas, returning the condensate formed by such condensation to said body of liquid, and adjusting the rate of supply of said cold liquefied gas in response to the differential in the vaporizing and condensing pressures of said heat exchange medium.

3. The method of vaporizing and superheating a cold liquefied gas to cool a fluid forming a heat source, which comprises vaporizing a body of liquid heat exchange medium through heat exchange with said fluid forming a heat source, condensing the vapors generated by such vaporization through heat exchange with said cold liquefied gas to thereby also vaporize said liquefied gas, returning the condensate formed by such condensation to said body of liquid, and cutting off the supply of said cold liquefied gas in response to a minimum vaporizing pressure of said heat exchange medium.

4. The method of vaporizing and superheating a cold liquefied gas to cool a fluid forming a heat source, which comprises vaporizing a body of liquid heat exchange medium through heat exchange with said fluid forming a heat source, condensing the vapors generated by such vaporization through heat exchange with said cold liquefied gas to thereby also vaporize said liquefied gas, returning the condensate formed by such condensation to said body of liquid, adjusting the rate of supply of said cold liquefied gas in response to the differential in the vaporizing and condensing pressures of said heat exchange medium and cutting off the supply of said cold liquefied gas in response to a minimum vaporizing pressure of said heat exchange medium.

5. The method of vaporizing and superheating a cold liquefied gas to cool a fluid forming a heat source, which comprises vaporizing a body of liquid heat exchange medium through heat exchange with said fluid forming a heat source, condensing the vapors generated by such vaporization through heat exchange with said cold liquefied gas to thereby also vaporize said liquefied gas, returning the condensate formed by such condensation to said body of liquid through an enclosed U-shaped liquid leg the height of which condensate in said leg varies in response to the differential in the vaporizing and condensing pressures of said heat exchange medium, adjusting the rate of supply of said cold liquefied gas in response to the differential in the vaporizing and condensing pressures of said heat exchange medium, cutting off the supply of said cold liquefied gas in response to a minimum vaporizing pressure of said heat exchange medium, and building up the body of liquefied heat exchange medium in the inlet side of said U-shaped liquid leg to continue its said vaporizing through heat exchange with said fluid forming a heat source following any reduction or shut off of the supply of said cold liquefied gas.

6. Apparatus for vaporizing and superheating a cold liquefied gas to cool a fluid forming a heat source comprising:

(1) an evaporator for a liquid heat exchange medium including (a) a first shell forming an evaporating chamber,
(b) a first heat exchange tube means in said evaporating chamber,
(c) means moving said fluid forming a heat source through the interior of said heat exchange tube means, and
(d) means applying said liquid heat exchange medium to the exterior of said first heat exchange tube means to cause said heat exchange medium to vaporize in said evaporating chamber, (2) a vapor conduit having one end communicating with said evaporating chamber, (3) a condenser for the vapors of said heat exchange medium including
 (a) a second shell forming a condensing chamber communicating with the other end of said vapor conduit,
 (b) a second heat exchange tube means in said condensing chamber,
 (c) means moving said cold liquefied gas through the interior of said second heat exchange tube means to vaporize and become superheated therein, and
 (d) an outlet from said second shell for the condensed heat exchange medium, and (4) means conducting said condensed heat exchange medium from said outlet to said means applying said liquid heat exchange medium to the exterior of said first heat exchange tube means.

7. Apparatus as set forth in claim 6 additionally including:
(e) a sump in the bottom of said first shell in which the liquid heat exchange medium collects to boil off in response to reduction in pressure in said first shell.

8. Apparatus as set forth in claim 6 additionally including:
(5) means adjusting the rate of supply of said cold liquefied gas in response to the differential in the vaporizing and condensing pressures of said heat exchange medium in said evaporating and condensing chambers, respectively.

9. Apparatus as set forth in claim 6 additionally including:
(5) means cutting off the supply of said cold liquefied gas in response to a minimum pressure in said evaporating chamber.

10. Apparatus as set forth in claim 6 additionally including:
(5) means adjusting the rate of supply of said cold liquefied gas in response to the differential in the vaporizing and condensing pressures of said heat exchange medium in said evaporating and condensing chambers, respectively, and
(6) means cutting off the supply of said cold liquefied gas in response to a minimum pressure in said evaporating chamber.

11. Apparatus as set forth in claim 6 wherein said conducting means for said condensed heat exchange medium comprises:
(a) a U-shaped liquid leg having
 (A) one side extending upwardly and connecting with said outlet from said second shell, and
 (B) its other side extending upwardly and connecting with said means applying said liquid heat exchange medium to the exterior of said first heat exchange tube means.

12. Apparatus as set forth in claim 11 wherein said one side of said U-shaped liquid leg is sufficiently longer than its said other side to provide a gravity flow of said condensed heat exchange medium from said outlet from said second shell to said means applying said liquid heat exchange medium to said exterior of said first heat exchange tube means.

13. Apparatus as set forth in claim 12 in which said one side of said leg is of enlarged cross sectional size at its upper end to store a buildup of said liquid heat exchange medium therein to continue its vaporization on said first heat exchange tube means in said evaporating chamber and additionally including:
(5) means adjusting the rate of supply of said cold liquefied gas in response to the differential in the vaporizing and condensing pressures of said heat exchange medium in said evaporating and condensing chambers, respectively, and
(6) means cutting off said supply of said cold liquefied gas in response to a minimum pressure in said evaporating chamber.

14. Apparatus as set forth in claim 13 wherein said second heat exchange tube means is positioned to have its lower part immersed by said buildup of said liquid heat exchange medium.

References Cited

UNITED STATES PATENTS

| | | | |
|---|---|---|---|
| 2,343,727 | 3/1944 | Zenner | 65—52 |
| 2,975,607 | 3/1961 | Bodle | 62—52 |
| 3,068,659 | 12/1962 | Marshall | 62—52 |
| 3,183,666 | 5/1965 | Jackson | 62—52 |

FOREIGN PATENTS 584,192  9/1959  Canada.

ROBERT A. O'LEARY, *Primary Examiner.*

ALBERT W. DAVIS, JR., *Assistant Examiner.*

U.S. Cl. X.R.

62—52; 165—39, 105, 106